(12) United States Patent
Wood et al.

(10) Patent No.: US 9,159,982 B2
(45) Date of Patent: Oct. 13, 2015

(54) BATTERY SYSTEM

(75) Inventors: Steven J. Wood, Shorewood, WI (US);
Dale B. Trester, Milwaukee, WI (US);
Gary P. Houchin-Miller, Milwaukee,
WI (US); Jacob G. Maki, Grand Rapids,
MI (US)

(73) Assignee: Johnson Controls Technology Company, Holland, MI (US)

( * ) Notice: Subject to any disclaimer, the term of this patent is extended or adjusted under 35 U.S.C. 154(b) by 1387 days.

(21) Appl. No.: 12/166,138

(22) Filed: Jul. 1, 2008

(65) Prior Publication Data

US 2009/0017366 A1    Jan. 15, 2009

Related U.S. Application Data

(63) Continuation of application No. PCT/US2007/000163, filed on Jan. 3, 2007.

(60) Provisional application No. 60/755,957, filed on Jan. 3, 2006.

(51) Int. Cl.
*H01M 10/50*    (2006.01)
*H01M 2/20*    (2006.01)
(Continued)

(52) U.S. Cl.
CPC .......... *H01M 2/206* (2013.01); *B60L 11/1874* (2013.01); *B60L 11/1879* (2013.01); *H01M 2/1061* (2013.01); *H01M 2/1077* (2013.01); *H01M 2/202* (2013.01); *H01M 10/425* (2013.01); *H01M 10/48* (2013.01); *H01M 10/613* (2015.04); *H01M 10/6557* (2015.04); *H01M 10/6563* (2015.04); *H01M 10/6566* (2015.04); *H01M 10/667* (2015.04); *Y02T 10/7005* (2013.01); *Y02T 10/705* (2013.01); *Y02T 10/7011* (2013.01)

(58) Field of Classification Search
USPC ............................................ 429/100, 62, 120
See application file for complete search history.

(56) References Cited

U.S. PATENT DOCUMENTS 7,846,577 B2 *    12/2010    Kozu et al. .................... 429/162
2004/0207368 A1 *    10/2004    Kimoto et al. ................ 320/150

FOREIGN PATENT DOCUMENTS

EP    1 030 387 A1    8/2000
EP    1 178 558 A2    2/2002
(Continued)

OTHER PUBLICATIONS

Response to Office Action for European Application No. 07716305.3, dated Feb. 23, 2010, 7 pages.
(Continued)

*Primary Examiner* — Ula C Ruddock
*Assistant Examiner* — Osei Amponsah
(74) *Attorney, Agent, or Firm* — Fletcher Yoder, P.C.

(57) ABSTRACT

A battery system includes a plurality of electrochemical cells each having at least one terminal and a plurality of members coupled together to form a frame for securing the electrochemical cells in place. At least one of the members has openings configured to receive the terminals of the plurality of cells and also has features for spacing apart the plurality of cells to facilitate the flow of a cooling fluid between the cells. The battery system further includes a battery management system provided at a first end of the frame and a device provided at a second end of the frame for providing the cooling fluid to the cells and to the battery management system simultaneously.

28 Claims, 14 Drawing Sheets

(51) Int. Cl.
*B60L 11/18* (2006.01)
*H01M 2/10* (2006.01)
*H01M 10/42* (2006.01)
*H01M 10/48* (2006.01)
*H01M 10/6563* (2014.01)
*H01M 10/6557* (2014.01)
*H01M 10/667* (2014.01)
*H01M 10/6566* (2014.01)
*H01M 10/613* (2014.01)

(56) References Cited

FOREIGN PATENT DOCUMENTS

JP 1996-167404 * 6/1996 ............. H01M 2/10
JP 2003-243049 * 8/2003 ............ H01M 10/50

OTHER PUBLICATIONS

International Search Report and Written Opinion of the International Searching Authority for International Application No. PCT/US2007/000163; filed Mar. 1, 2007; date of mailing Jul. 16, 2007; 8 pages.
Office Action for Chinese Application No. 200780001567.9, dated Apr. 28, 2011, 6 pages including English translation.
Office Action for Chinese Application No. 200780001567.9, dated Oct. 16, 2009, 8 pages including English translation.
Office Action for European Application No. 07716305.3, dated Oct. 16, 2009, 2 pages.

* cited by examiner

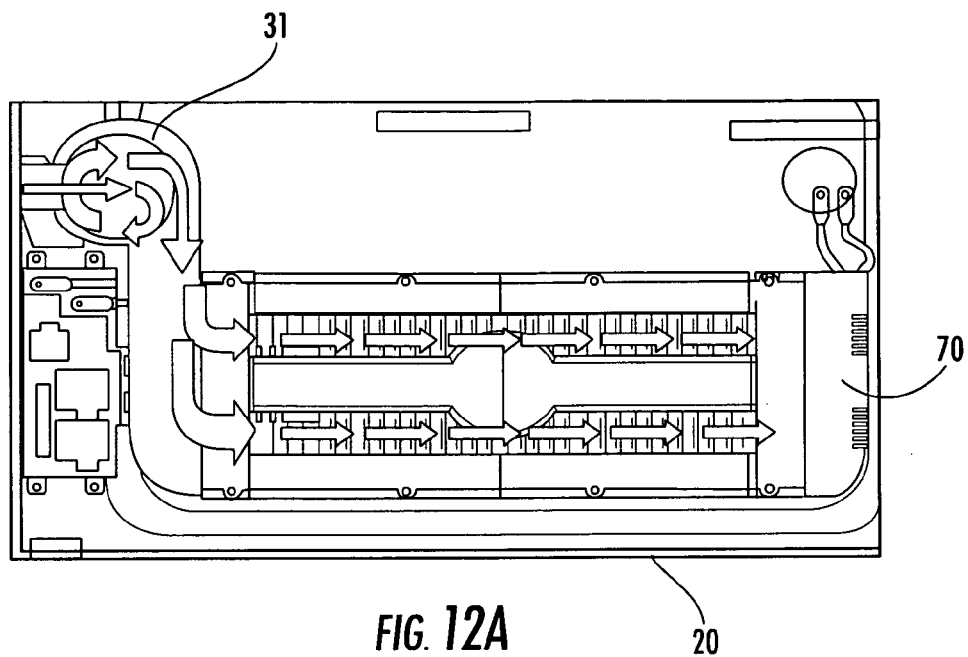
FIG. 12A
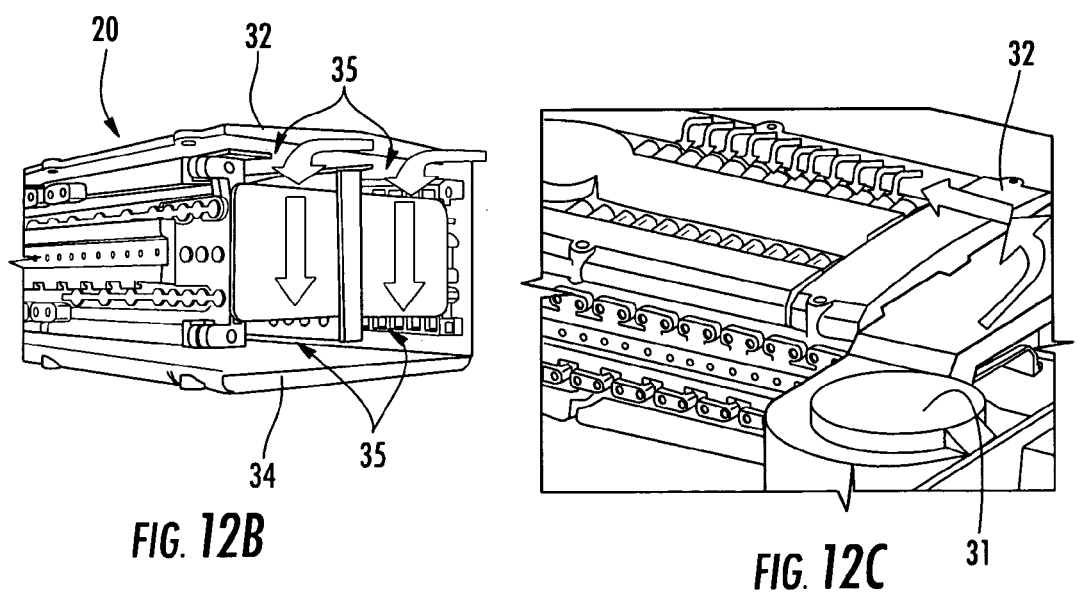
FIG. 12B
FIG. 12C

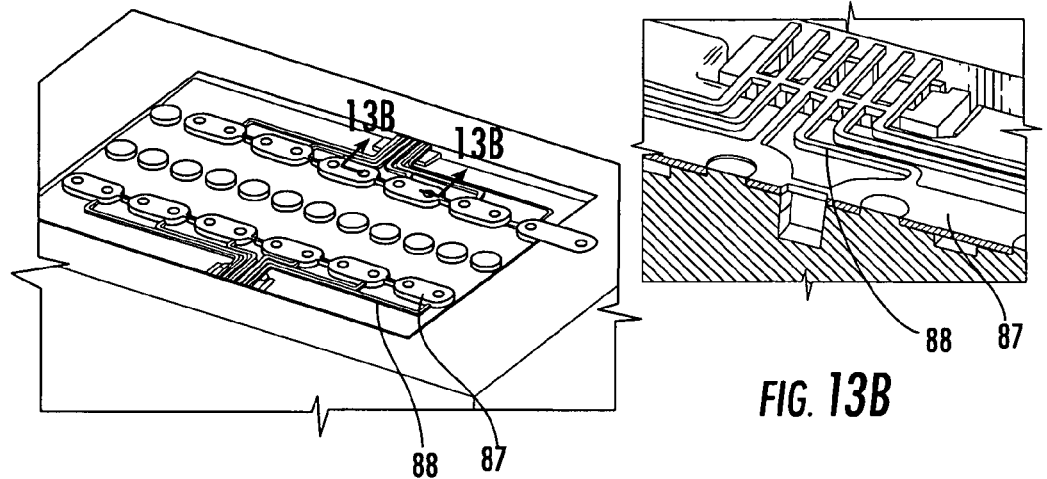
FIG. 13A
FIG. 13B
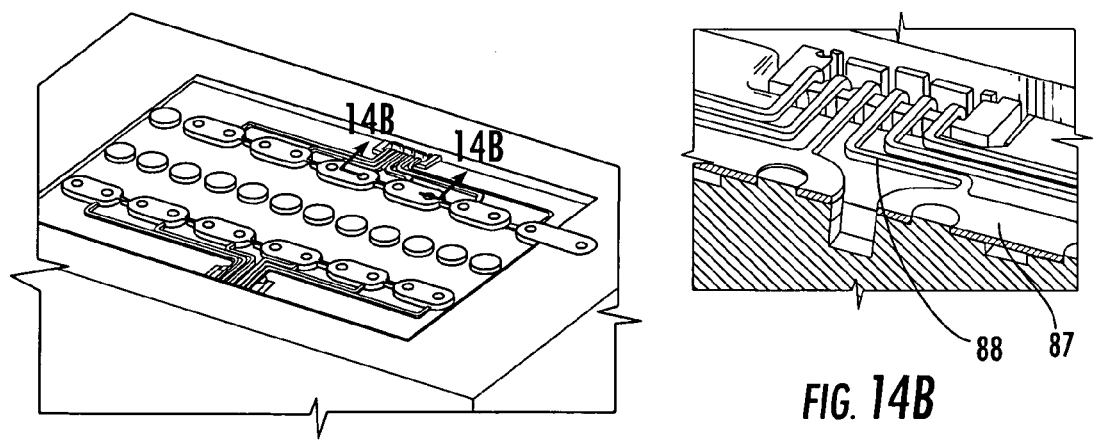
FIG. 14A
FIG. 14B

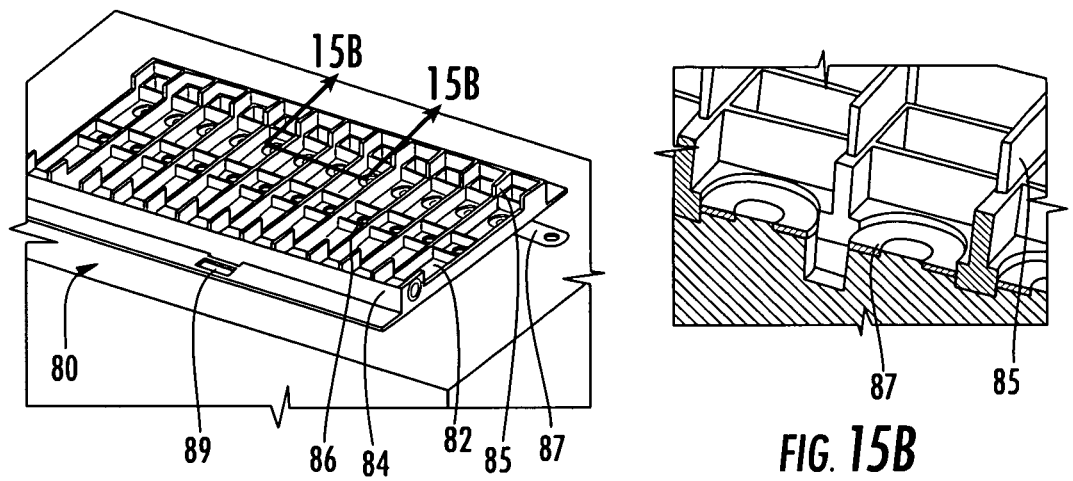
FIG. 15A
FIG. 15B
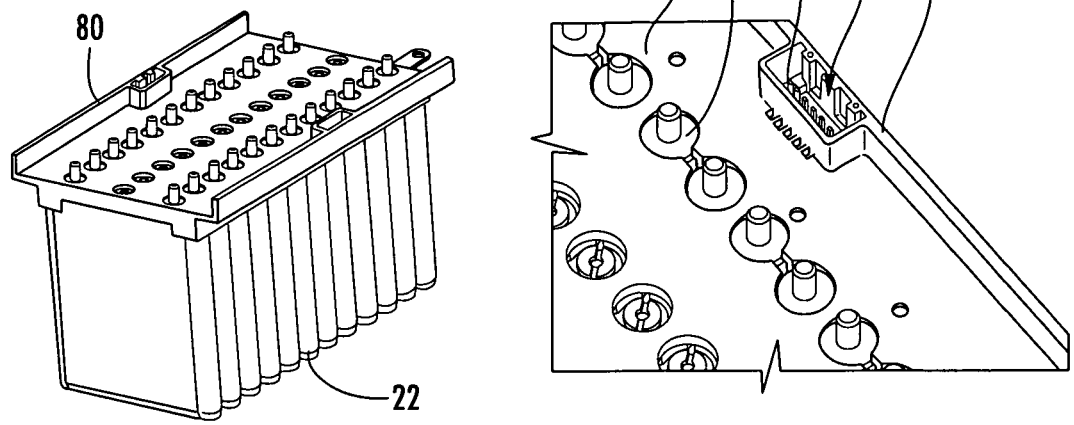
FIG. 16A
FIG. 16B

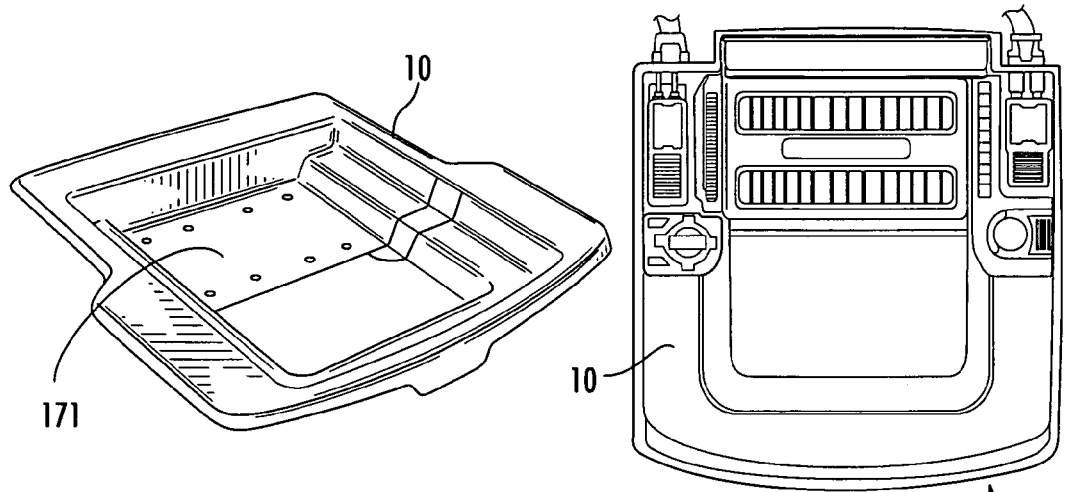
FIG. 17A
FIG. 17C
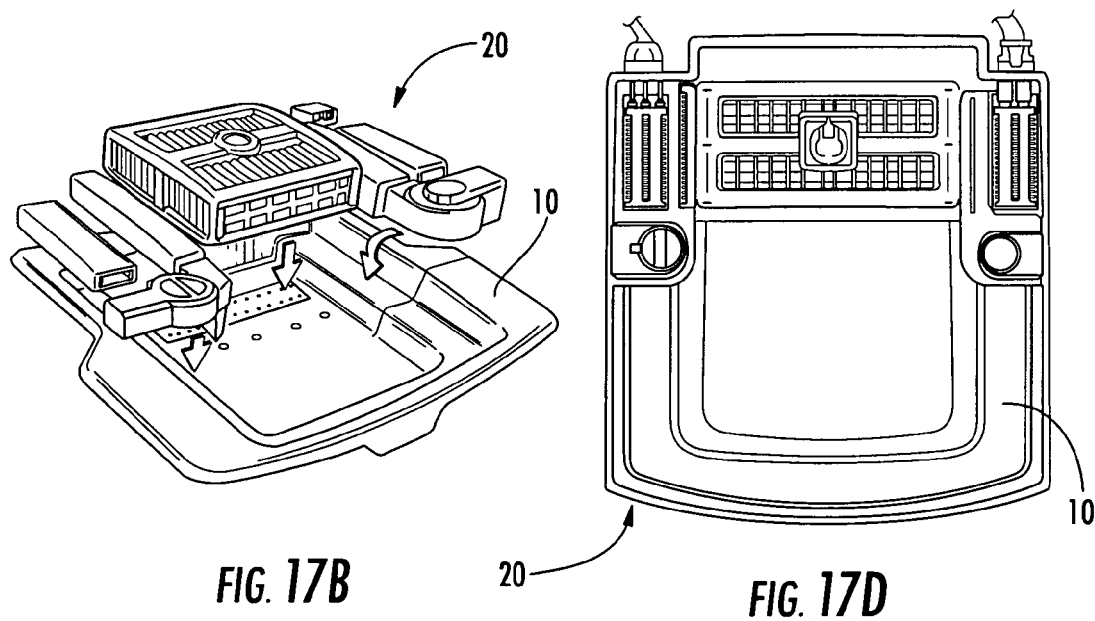
FIG. 17B
FIG. 17D

BATTERY SYSTEM

CROSS-REFERENCE TO RELATED APPLICATIONS

This application is a Continuation of International Application PCT/US2007/000163, filed Jan. 3, 2007, which claims the benefit of and priority to U.S. Patent Application No. 60/755,957 filed Jan. 3, 2006. International Application PCT/US2007/000163 and U.S. Patent Application No. 60/755,957 are incorporated herein by reference in their entirety.

BACKGROUND

The present invention relates generally to the field of batteries and battery systems. More specifically, the present system relates to a system for packaging, connecting and regulating a plurality of batteries (e.g., in a cell assembly or module).

It is known to provide batteries for use in vehicles such as automobiles. For example, lead-acid batteries have been used in starting, lighting, and ignition applications. More recently, hybrid vehicles have been produced which utilize a battery (e.g., a nickel-metal-hydride (NiMH) battery) in combination with other systems (e.g., an internal combustion engine) to provide power for the vehicle.

Lithium-ion batteries have a higher charge density than nickel metal hydride batteries (i.e., a lithium-ion battery can be smaller than an equivalent nickel metal hydride while still holding the same charge), and therefore occupy much less space while accommodating generally similar electrical loads.

It is generally known that lithium batteries perform differently than nickel-metal-hydride batteries. In some applications, it may be desirable to obtain the enhanced power and/or performance of a lithium battery. For example, lithium batteries may provide greater specific power than nickel-metal-hydride batteries. However, the application of lithium battery technology may present design and engineering challenges beyond those typically presented in the application of conventional nickel-metal-hydride battery technology.

The design and management of a lithium battery system that can be advantageously utilized in a hybrid vehicle may involve considerations such as electrical performance monitoring, thermal management, and containment of effluent (e.g., gases that may be vented from a battery cell). For example, thermal management is often an important consideration for vehicles utilizing lithium battery systems because high temperatures can create dangerous situations and greatly reduce usable battery life.

Typical hybrid electric vehicle batteries require 50 to 150 or more buss bars connecting individual battery cells or modules. Each of these must be separately placed and fastened onto the assembly. Each buss bar must have a wire with a terminal leading to a connector for sensing the voltage step of each cell or module. This leads to a total of 250 to 750 or more parts, including buss bars, nuts, wires, and terminals. The typical relatively complicated assembly and large number of parts required may increase manufacture, retail, and maintenance costs and may deter manufacturers and consumers from making or purchasing hybrid electric vehicles.

A battery management system component for a battery module is typically separate from the battery module. Such a typical system may add further complication to the assembly of battery systems and may also increase the length of the wire(s) needed to connect the battery management system to the battery. Relatively long connecting wires may lead to the introduction of performance-affecting electrical noise that may interfere with the battery management system and/or battery system operation. Typical battery management systems and battery systems may also be difficult to maintain, service, and/or replace as the battery management system is typically not integrated with the battery module.

It would be desirable to provide a battery system that includes one or more lithium batteries or cells (e.g., lithium-ion batteries or cells). It would further be desirable to provide a battery system that includes a design that is configured to provide cooling for the batteries or cells included therein. It would further be desirable to provide a battery system that is relatively simple to assemble and that used a relatively small number of parts. It would further be desirable to provide a battery system that includes a battery management system or module that is provided in relatively close proximity to the battery system, minimizing the length of wires necessary to couple the battery management system to the battery system. It would further be desirable to provide a battery system that includes a battery management system that is integrated with the battery system.

It would be desirable to provide a system and/or method that satisfies any one or more of these needs or provides other advantageous features as will be apparent to those reviewing the present disclosure. The teachings disclosed extend to those embodiments that fall within the scope of the claims, regardless of whether they accomplish one or more of the aforementioned needs.

SUMMARY

One exemplary embodiment of the invention relates to a battery system that includes a plurality of electrochemical cells each having at least one terminal and a plurality of members coupled together to form a frame for securing the electrochemical cells in place. At least one of the members has openings configured to receive the terminals of the plurality of cells and also has features for spacing apart the plurality of cells to facilitate the flow of a cooling fluid between the cells. The battery system further includes a battery management system provided at a first end of the frame and a device provided at a second end of the frame for providing the cooling fluid to the cells and to the battery management system simultaneously.

Another exemplary embodiment of the invention relates to a battery system that includes a plurality of electrochemical cells each having at least one terminal and a plurality of members coupled together to form a frame for securing the electrochemical cells in place. At least one of the members has openings configured to receive the terminals of the plurality of cells and also has features for spacing apart the plurality of cells to facilitate the flow of a cooling gas between the cells. The battery system also includes a plurality of connectors. Each of the connectors includes a conductive element configured for coupling to terminals of adjacent electrochemical cells to facilitate electrical current flow between the terminals of the adjacent electrochemical cells. The battery system further includes an insulating body at least partially surrounding each of the conductive elements.

Another exemplary embodiment of the invention relates to a battery system that includes a plurality of electrochemical cells each having at least one terminal and a frame for securing the electrochemical cells in place. The battery system also includes a plurality of connectors. Each of the connectors includes an electrically conductive element configured for coupling to terminals of adjacent electrochemical cells to facilitate electrical current flow between the terminals of the adjacent electrochemical cells. The battery system further includes an insulating body at least partially surrounding each of the conductive elements. The battery system still further includes a device coupled to the frame for providing a cooling gas to the cells. The plurality of electrochemical cells are provided in two rows with the terminals of the plurality of electrochemical cells facing outward. Each row is partially received by an outer member having terminal holes and having features for spacing apart the plurality of cells to facilitate the flow of the cooling gas between the cells.

BRIEF DESCRIPTION OF THE DRAWINGS

FIG. 12A is a schematic view of the airflow through a cell assembly.

FIG. 12B is a schematic view of the airflow through top air spaces of the cell assembly shown in FIG. 12A.

FIG. 12C is a schematic view of the airflow between cells shown in FIG. 12A.

FIG. 13A is a perspective view of integrally formed connectors and leads for a cell assembly according to an exemplary embodiment.

FIG. 13B is a partial section view of integrally formed connectors and leads shown in FIG. 13A taken along line 13B-13B.

FIG. 14A is a perspective view of the integrally formed connectors and leads shown in FIG. 14A after a punching operation.

FIG. 14B is a partial section view of the integrally formed connectors and leads after a punching operation shown in FIG. 14A taken along line 14B-14B.

FIG. 15A is a perspective view of integrally formed connectors, leads, and beam according to an exemplary embodiment after an injection molding operation.

FIG. 15B is a partial section view of integrally formed connectors, leads, and beam as shown in FIG. 15A taken along line 15B-15B.

FIG. 16A is a perspective view of a cell assembly according to an exemplary embodiment.

FIG. 16B is a partial perspective view of a terminal hole of the cell assembly shown in FIG. 16A.

FIG. 17A is a perspective view of a housing for a cell assembly according to an exemplary embodiment.

FIG. 17B is an exploded view of a cell assembly and other components.

FIGS. 17C and 17D are plan views of a cell assembly according to other embodiments.

DETAILED DESCRIPTION

Figure 1:
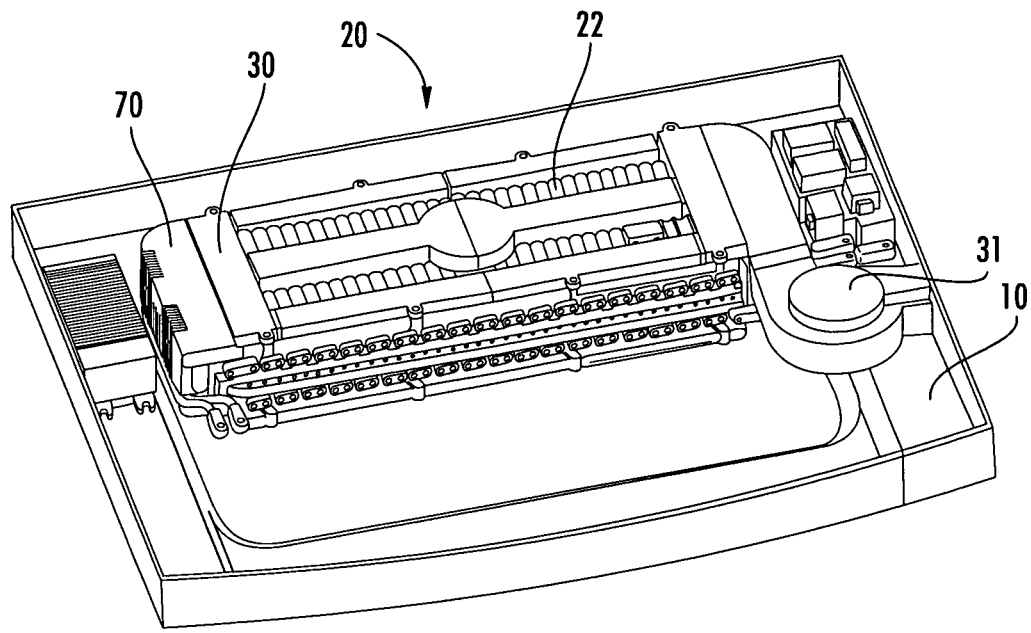
FIG. 1 is a perspective view of a cell assembly or module according to an exemplary embodiment.

Referring generally to FIGS. 1-10, a cell assembly or battery module 20 is shown. Cell assembly 20 serves to package, connect, and regulate a group of electrochemical cells and is intended to be provided in a vehicle. According to an exemplary embodiment, cell assembly is placed in a tray or housing 10. Cell assembly 20 comprises electrochemical cells or batteries 22, a frame 30, spacers 60, connectors 64, covers 68, a battery management system 70, and bolts 90. Cell assembly 20 is scaleable and can be lengthened or shortened to accommodate different vehicles by increasing the number of cells.

According to an exemplary embodiment, electrochemical cells 22 are generally prismatic lithium-ion cells and are configured to store an electrical charge. According to other exemplary embodiments, cells could take other shapes or forms (e.g., oval, round, rectangular, etc.). According to still other alternative embodiments, cells could be nickel metal hydride, nickel cadmium or any other suitable electrochemical cells.

While the accompanying FIGURES illustrate particular exemplary embodiments of lithium batteries and battery systems, any of a variety of lithium batteries or battery systems may be used according to various other exemplary embodiments. For example, according to various exemplary embodiments, the physical configuration of the individual cells and/or the modules may be varied according to design objectives and considerations, and the number of cells included in the system or module may differ.

Various nonexclusive exemplary embodiments of lithium batteries are shown and described in U.S. patent application Ser. No. 10/976,169, filed Oct. 28, 2004, the entire disclosure of which is hereby incorporated by reference. The batteries, modules, and other features described herein may be used in conjunction with features disclosed in U.S. patent application Ser. No. 10/976,169, as will be appreciated by those of skill in the art reviewing this disclosure. Further, according to an exemplary embodiment in which a module or system including a plurality of lithium batteries is provided, the module may be included in a system that includes a plurality of lithium battery modules of any presently known configuration or any other configuration that may be developed in the future.

Figure 2:
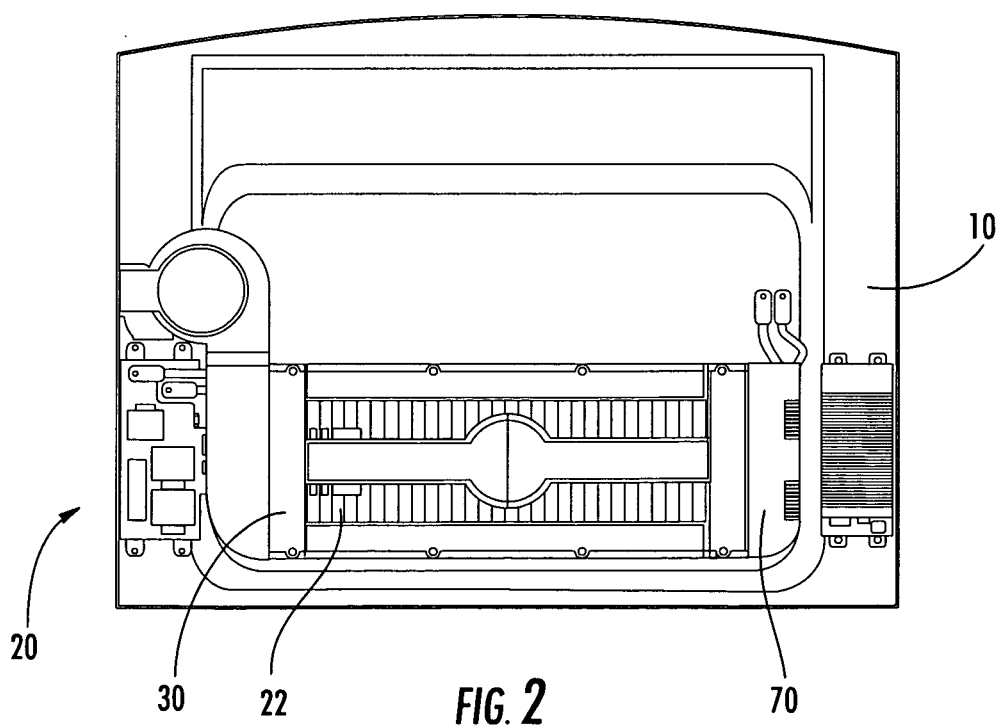
FIG. 2 is a plan view of the cell assembly or module shown in FIG. 1.

FIG. 1 shows a perspective view of a battery system, cell assembly, or module in a tray or housing 10 according to an exemplary embodiment. FIG. 2 shows a plan view of a battery system, cell assembly, or module in housing 10, according to an exemplary embodiment. Housing 10 may typically be installed into a rear portion of a vehicle, perhaps residing in a trunk portion. Housing 10 may be integral with structures of the vehicle, or may be installed into the vehicle. Housing 10 may fit the contours of the vehicle and provide stability to the various components of the battery system including frame 30. When installed into housing 10, a surface of housing 10 may also serve as a cover or surface of frame 30 (e.g., a bottom cover, etc.). Frame 30 may provide interfaces to various components such as forced air system 31 and battery management system 70. According to other various embodiments, battery management system 70 and/or elements of forced air system 31 may serve as end covers or partial end covers to frame 30.

Figure 3A:
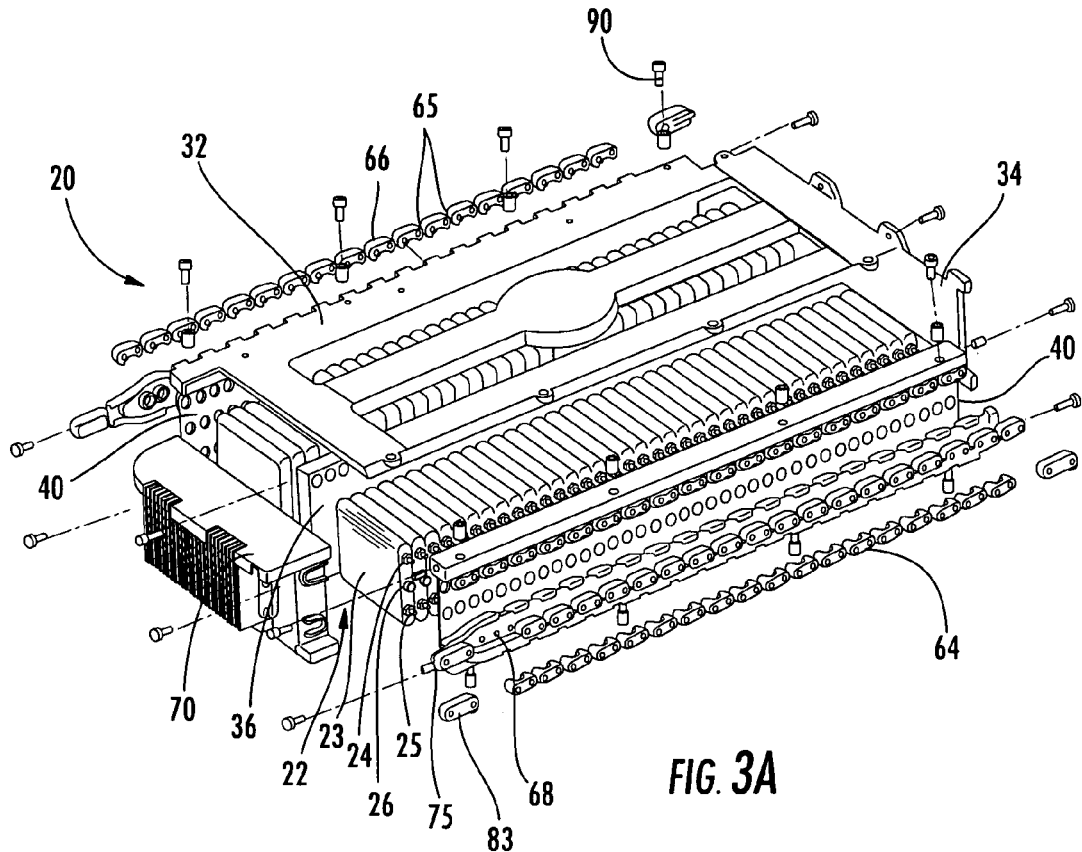
FIGS. 3A and 3B are exploded perspective views of a cell assembly or module according to an exemplary embodiment.

As shown in FIG. 3A, each of the cells 22 comprise a housing or casing 23 (e.g., a can), at least one negative terminal 24, at least one positive terminal 25, and a vent 26. Casing 23 is a generally hollow body that serves as a container for internal components (e.g., anode, cathode, electrolyte, etc.) of cell 22 and defines the shape of cell 22. Negative terminal 24 is a metallic member (e.g., a bar, rod, etc.) that is conductively coupled to the anode or negative electrode (not shown) of cell 22. Positive terminal 25 is metallic member (e.g., a bar, rod, etc.) that is conductively coupled to the cathode or positive electrode (not shown) of cell 22. Vent 26 is a component that allows a controlled release of pressure if cell 22 fails, reducing the chance of casing 23 rupturing.

Figure 3B:
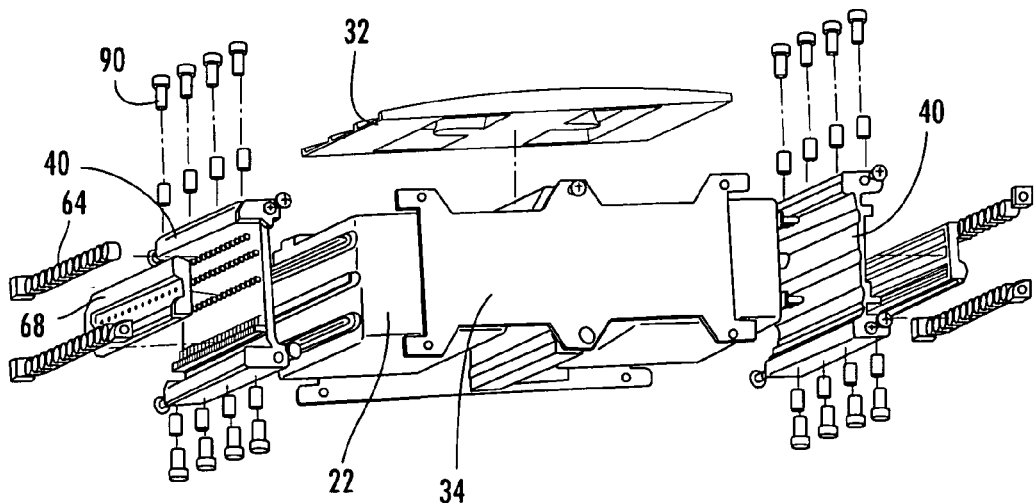

As shown in FIGS. 3A and 3B, frame 30 is a structure that provides a base to which other components of cell assembly 20 are coupled or mounted. According to an exemplary embodiment, frame 30 comprises a cover 32, an end cover 34, outside beams 40, and a center beam 36. According to various exemplary embodiments, the pieces or structures of frame 30 serve to package, space, support, and connect the cells 22.

Cover 32 (plate, cap, lid, shroud, etc.) is a generally flat member that protects and substantially seals the top (e.g., top portion, top plane, etc.) of cell assembly 20 and facilitates the passage of airflow over cells 22. According to an exemplary embodiment, top cover 32 is configured to cooperate with outside beams 40 so that top cover 32 can be bolted to outside beams 40. Top cover 32 also includes a series of spaced apertures configured to receive bolts 90 extending from or through end cover 34. According to other exemplary embodiments, top cover 32 may be coupled to outside beams 40 by other methods (e.g., snap fit, rivets, interference fit) or may be integrally formed with one or more other frame components.

According to an alternative embodiment, cover 32 is a member that protects and substantially seals the bottom (e.g., bottom portion, bottom plane, etc.) of cell assembly 20 and facilitates the passage of airflow over cells 22. According to other various exemplary embodiments, a top cover and a bottom cover may be provided and may both facilitate the passage of airflow over and/or around cells 22. According to another exemplary embodiment, a surface or plane of housing 10 may serve as one or more covers (top and/or bottom) of cell assembly 20, facilitating the passage of airflow over cells 22.

End cover 34 (e.g., plate, cap, etc.) is a generally flat member that protects one distal end of cell assembly 20. According to an exemplary embodiment, end cover 34 is configured to cooperate with outside beams 40, top cover 32, and center beam 36 so that end cover 34 can be bolted to outside beams 40, top cover 32, and center beam 36 in a manner that defines one or more spaces 35 (shown, for example, in FIG. 12B) above and/or below cells 22 to facilitate airflow over and/or under cells 22. According to other exemplary embodiments, end cover 34 may be coupled to outside beams 40, top cover 32, and center beam 36 by other methods (e.g., snap fit, rivets, interference fit, etc.) or may be integrally formed with one or more other frame components. End cover 34 is shown as being shorter than outside beams 40, but end cover 34 may be longer than outside beams 40 depending on the number of cell rows and/or the number of cells in each row. According to some various exemplary embodiments, end cover 34 may provide an interface between frame 30 and forced air system 31 and may help control cooling gas flow from forced air system 31 to the various spaces and components of cell assembly 20 and frame 30.

Referring to FIGS. 3A-5B, outside beam 40 is a generally elongated member that provides rigidity to frame 30, locates and spaces cells 22, restrains cells 22, supports cells 22, and allows access to terminals 24, 25. Outside beam 40 comprises a web portion 41 with a back side 43 (e.g., inside, cell side, interior side, etc.) and a front side 42 (e.g., outside, connection side, exterior side, etc.), flanges 44, fins 46, guiding surfaces 48, terminal holes 50, terminal shrouds 52, vent holes 54, vent shrouds 56 and holes 58. According to an exemplary embodiment, outside beams 40 of frame 30 may be considered side beams 40 as they may form or serve as the sides of a rectangular frame 30.

Figure 4:
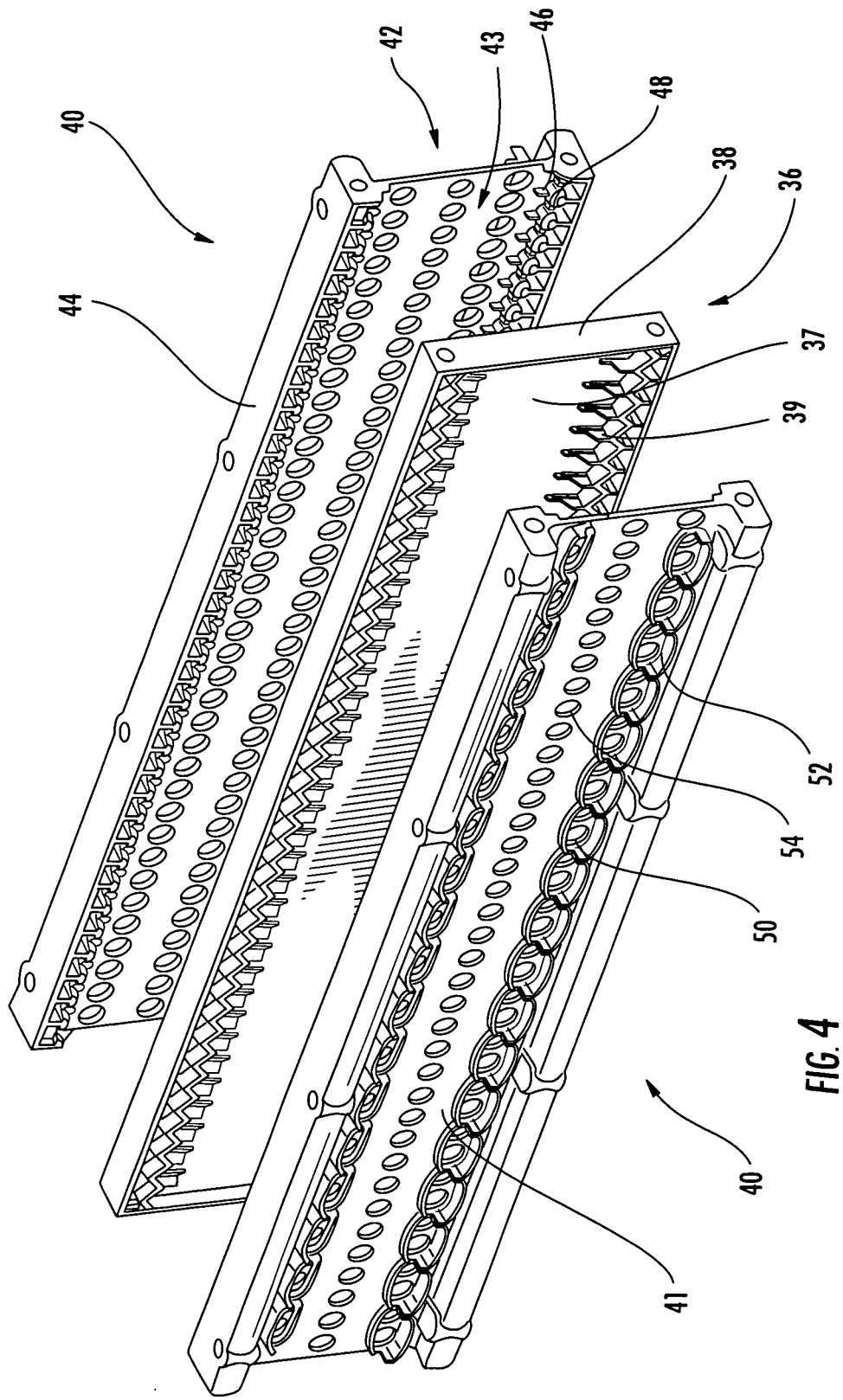
FIG. 4 is a perspective view of the support beams for use with the cell assembly shown in FIG. 1.
Figure 5A:
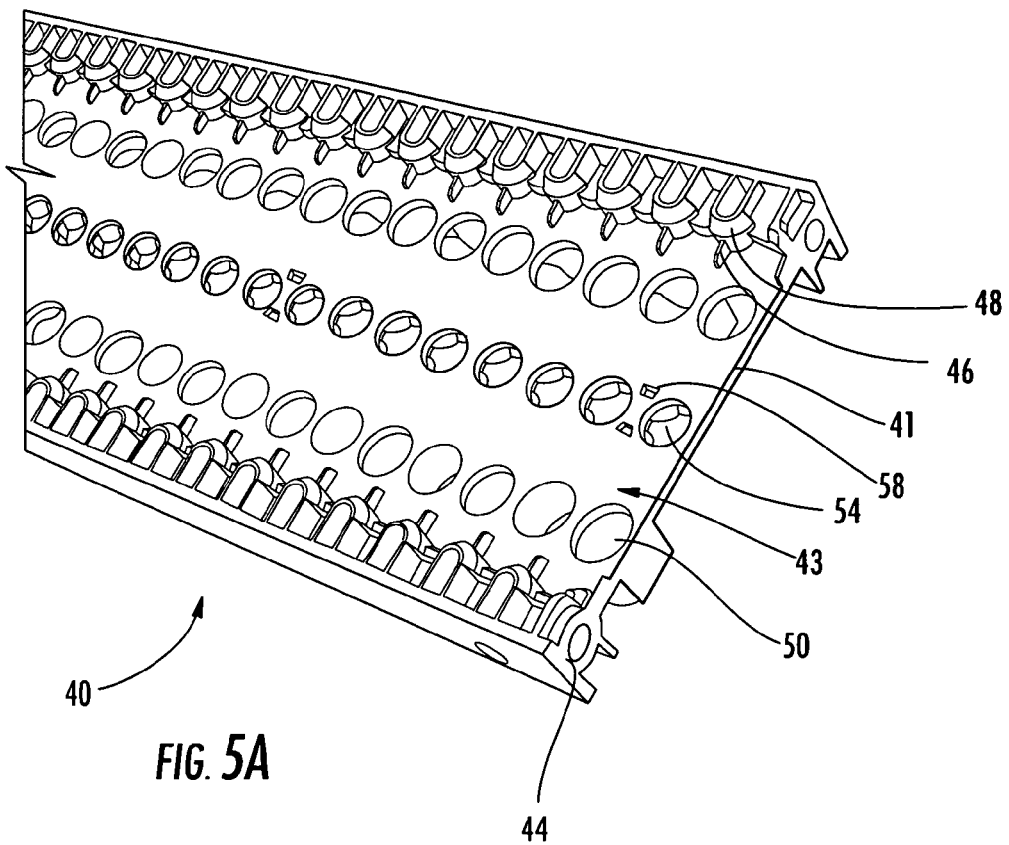
FIGS. 5A and 5B are front and rear perspective views of an outside beam for use with the cell assembly shown in FIG. 1.
Figure 5B:
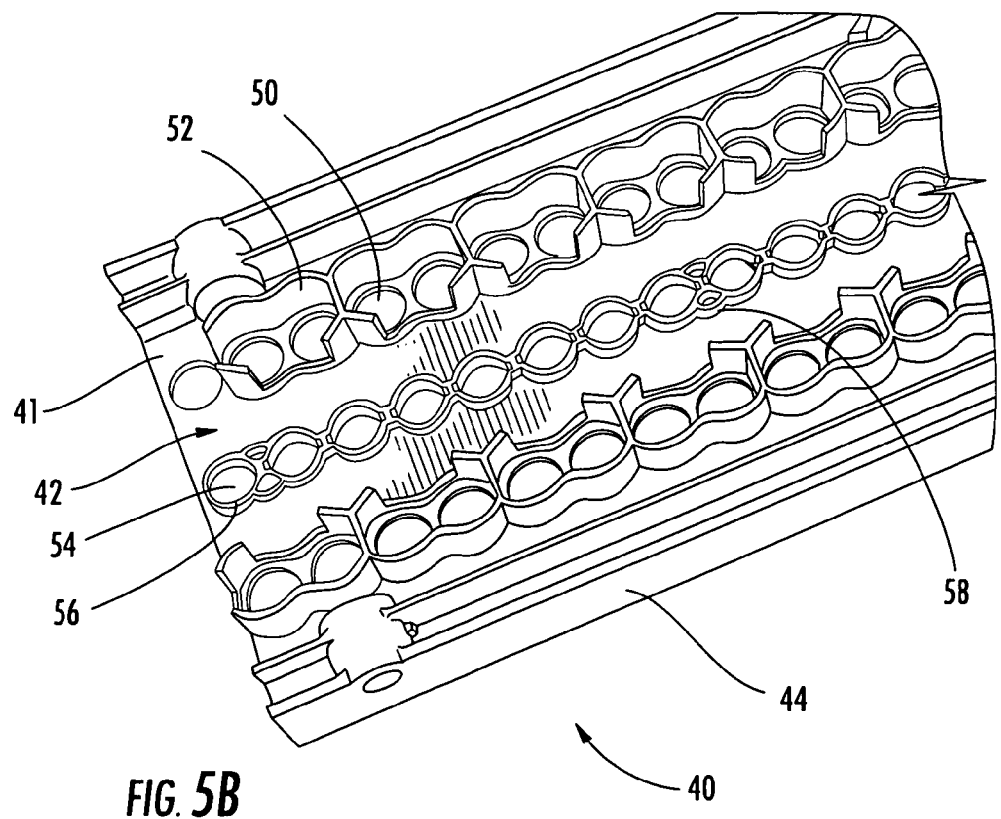

As shown in FIGS. 4 and 5A, back side 43 of outside beam 40 is illustrated according to an exemplary embodiment. Back side 43 is generally configured to help support cells 22 and to at least assist in controllably providing a space between cells 22 such that a space between adjacent cells is provided. The space between adjacent cells is configured to allow airflow between adjacent cells for cooling purposes. Front side 42 is shown in FIG. 5B according to an exemplary embodiment. Front side 42 may generally be configured to provide access and/or connection to cell terminals protruding through terminal holes 50. According to various other exemplary embodiments, the orientation and shape of back side 43 and front side 42 of beam 40, and the components thereof, may be different from that shown in the FIGS. 4 and 5.

Flanges 44 are provided along the top and bottom longitudinal edges of outside beam and generally add rigidity to outside beam 40 by increasing bending strength. Fins 46 are protrusions or extensions (e.g., projections, spines, protuberances, partitions, etc) spaced at regular intervals along the longitudinal axis of outside beam 40 on the back side 43 of web portion 41 and generally along the top and bottom edges. Guiding surfaces 48 are surfaces (e.g., slopes, lead-ins, ramps, etc.) spaced at regular intervals on the back side 43 of web portion 41 and generally in line with fins 46. Fins 46 and guiding surfaces 48 serve to align and space cells 22 by guiding them to be received into the spaces between adjacent fins 46. Once cells 22 are received by fins 46 and guiding surfaces 48, terminal holes 50 may receive terminals 24 and 25 of cells 22. According to various other exemplary embodiments, fins 46 and guiding surfaces 48 may be configured differently to match the specific shape and/or orientation of cells 22. For example, to the extent surfaces of cells 22 are angled or rounded, the fins and guiding surfaces may also be shaped accordingly.

Terminal holes 50 are openings (e.g., apertures, passages, etc.) spaced at regular intervals along the longitudinal axis of outside beam 40 generally in line with the spaces between fins 46 that are configured to receive terminals 24, 25 of cells 22 and allow terminals 24, 25 to extend through web portion 41 but prevent casings 23 of cells 22 from extending through web portion 41. According to an exemplary embodiment, terminal holes 50 are generally round. According to other exemplary embodiments, terminal holes 50 could be oval, square, rectangular or any other shape suitable for receiving terminals 24, 25 of cells 22. Terminal shrouds 52 are outwardly extending flanges (e.g., fins, guards, projections, etc.) on the front side 42 of web portion 41 around the circumference of terminal holes 50 and generally serve to protect terminals 24, 25 of cells 22 and reduce the chance of short-circuiting and accidental shock. According to an exemplary embodiment, terminal shrouds 52 extend partially around the circumference of terminal holes 50. According to other exemplary embodiments, terminal shrouds 52 may extend fully around circumference of terminal holes 50 or more or less than in exemplary embodiments.

Vent holes 54 are openings (e.g., apertures, passages, etc.) spaced at regular intervals along the longitudinal axis of outside beam 40 generally in line with the spaces between fins 46 that are configured align with vents 26 on individual cells 22. According to an exemplary embodiment, vent holes 54 are generally round. According to other exemplary embodiments, vent holes could be oval, square, rectangular or any other shape. Vent shrouds 56 are outwardly extending flanges (e.g., fins, guards, projections, etc.) on the front side 42 of web portion 41 around the circumference of vent holes 54 and generally serve to protect vents 26. According to an exemplary embodiment, outside beam 40 includes a plurality of additional holes 58 that may serve as openings for wire ties (e.g., fasteners, hold downs, etc.) to secure voltage sense leads.

To facilitate the coupling of outside beam 40 to top cover 32, end cover 34, battery management system 70, and vehicle, outside beam 40 includes a series of spaced apertures configured to receive bolts extending from or through top cover 32, end cover 34, battery management system 70, and vehicle. According to other embodiments, outside beam 40 could be coupled to other components by other means (e.g., snap fit, rivets, interference fit).

Center beam 36 is a generally elongated member or element that provides rigidity to frame 30 and locates and spaces cells 22. According to an exemplary embodiment, center beam 36 comprises a web portion 37, a flange portion 38, and fins 39. Web portion 37 is a generally flat body and serves as the main body of center beam 36. Flange portion 38 includes flanges extending from either side of web portion 37 and extends around the circumference of web portion 37. According to an exemplary embodiment, flange portion 38 includes a single continuous flange. According to other exemplary embodiments, flange portion could include multiple continuous flanges or a discontinuous flange. Fins 39 are protrusions (e.g., projections, spines, protuberances, partitions, etc) spaced at regular intervals along the longitudinal axis of outside beam on both sides of web portion 37 and generally along the top and bottom edges. Fins 39 may serve, locate, support and space cells 22.

To facilitate the coupling of center beam 36 to end cover 34 and battery management system 70, center beam 36 includes a series of spaced apertures configured to receive bolts extending from or through end cover and battery management system. According to other exemplary embodiments, center beam may include additional apertures to facilitate coupling center beam to other components (e.g., top plate, vehicle, etc.). According to still other embodiments, center beam could be coupled to other components by other means (e.g., snap fit, rivets, interference fit).

Figure 6A:
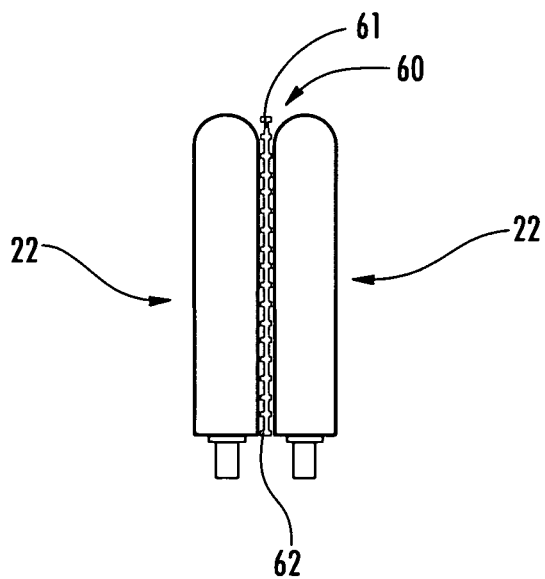
FIG. 6A is an elevation view of two adjacent cells for use with the cell assembly shown in FIG. 1.
Figure 6B:
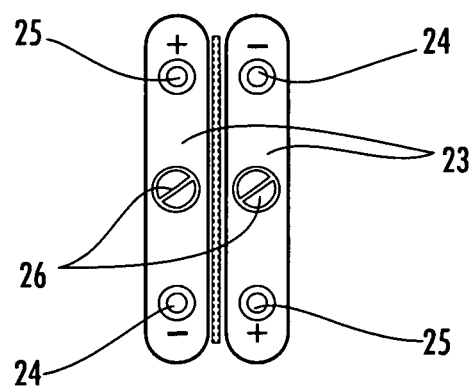
FIG. 6B is a plan view of two adjacent cells for use with the cell assembly in FIG. 1.

Referring to FIGS. 6A and 6B, according to an exemplary embodiment, an elevation view and plan view of two adjacent cells for use with the battery system are respectively shown. The battery system may make use of spacers oriented between adjacent cells 22 and may assist in the controlled spacing and stability of cells 22 while facilitating airflow between the adjacent cells. Spacers 60 are members or elements that include a web portion 61 and a plurality of ribs 62 and serve to separate and allow the flow of a cooling gas such as air between adjacent cells 22. Web portion 61 is a generally flat, thin body. Ribs 62 are bodies (e.g., fins, flanges, ridges, etc.) that extend outward from both sides of web portion 61. Spacers 60 are oriented between adjacent cells 22 in a manner which allows airflow between adjacent cells 22 through channels between adjacent ribs 62. According to other exemplary embodiments, ribs may vary in spacing and dimensions, varying the size and number of channels and the spacing between adjacent cells.

Figure 7A:
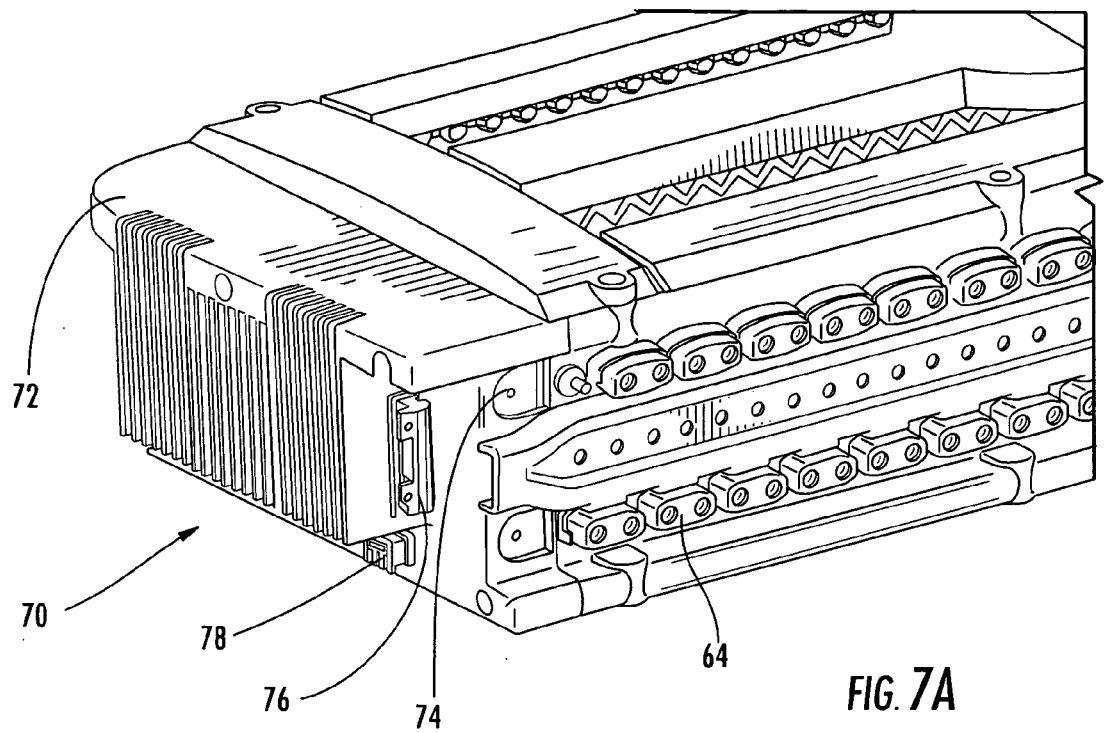
FIGS. 7A and 7B are close-up perspective views of a portion of the cell assembly shown in FIG. 1.
Figure 7B:
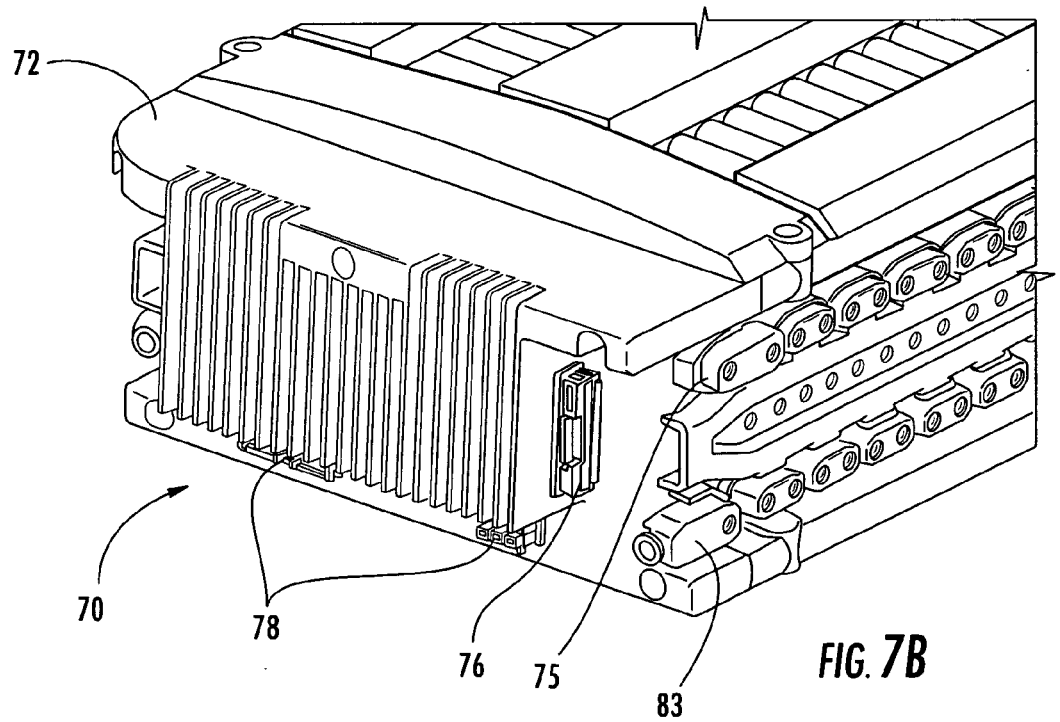
Figure 8:
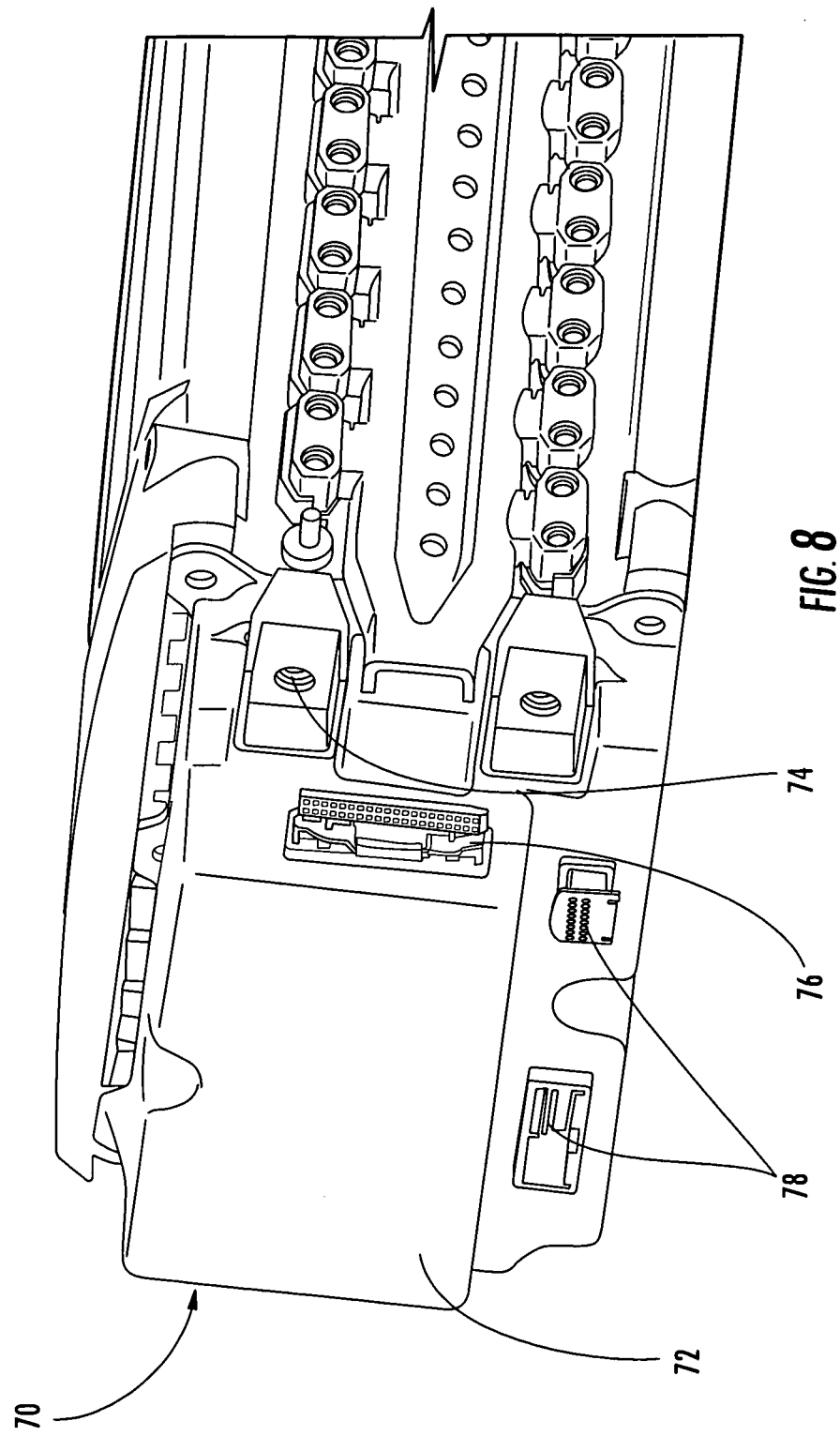
FIG. 8 is a close-up perspective view of a portion of cell assembly according to another exemplary embodiment.
Figure 9:
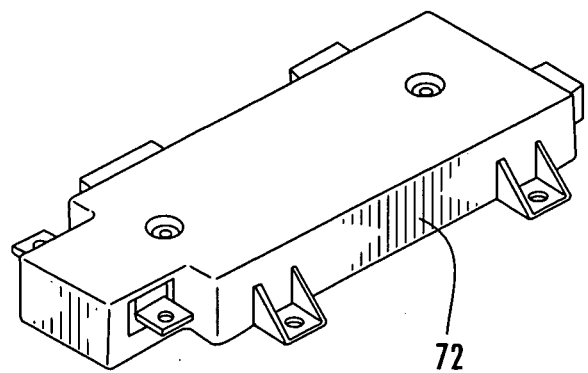
FIG. 9 is a perspective view of a body of a battery management system according to an exemplary embodiment.
Figure 10A:
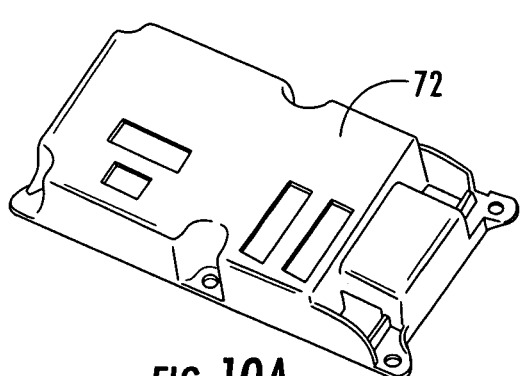
FIGS. 10A-10D are perspective views of bodies of a battery management system according to other exemplary embodiments.
Figure 10B:
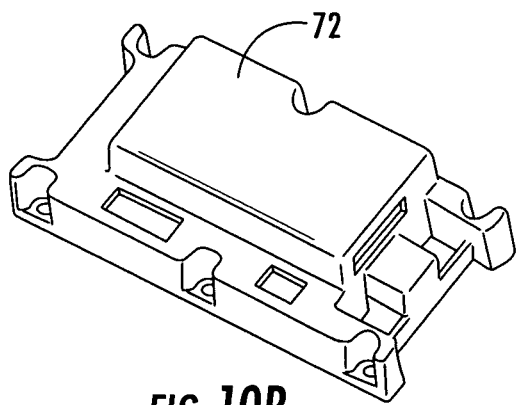
Figure 10C:
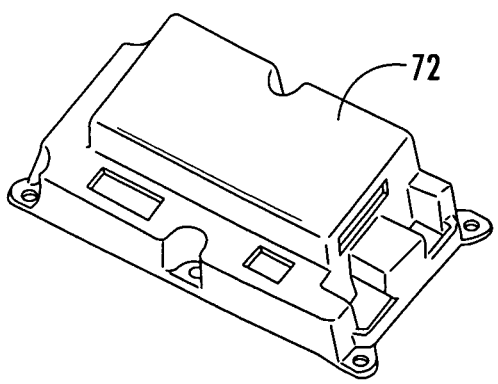
Figure 10D:
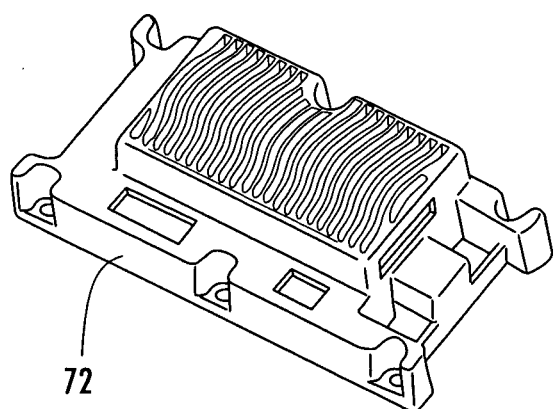

Referring to FIGS. 3A, 3B, and 7A, connectors 64 are members or elements that generally serve to connect terminals 24, 25 of adjacent cells 22 and allow electrical current to flow between adjacent cells 22. Connectors 64 have openings that serve to allow terminals 24, of cells 22 to extend partially or completely in to connector 64 and comprise a pair of terminals 65 and an insulating body 66. Terminals 65 receive terminals 24, 25 and are composed of a continuous body or otherwise coupled to allow electrical current to flow between terminals 65. Insulating body 66 is a non-conductive material (e.g., PVC, ABS, etc.) and surrounds terminals 65. Insulating body 66 reduces the chance of electrical shock. According to an exemplary embodiment, connectors 64 snap on to terminals 24, 25 of cells 22. According to other exemplary embodiments, cells could be connected with bolt and buss bars or any other suitable electrical connection. According to yet other exemplary embodiments, cells could be connected with connectors installed or formed within outer beams.

Covers 68 are generally long flat members that shield negative terminal 24, positive terminal 25, and any other high voltage wires and connections and generally serve to reduce the chance of electric shock.

Referring to FIGS. 1, 2, 3, 7A, 7B, and 8, battery management system 70 is provided to control various aspects of the battery system. For example, the battery management system 70 may act to control the charge level and charge rate of individual cells 22 in the system. Battery management system 70 may include various circuitry and software that is configured to control such functions. The particular configuration of the battery management system may vary according to various exemplary embodiments, and may include any of a variety of features configured to control or monitor various aspects of the battery system.

According to an exemplary embodiment, battery management system 70 comprises a body 72 (e.g., a housing, casing, container, etc.), shunt terminals 74, shunt connectors 75, cable connectors 83, high voltage connections 76, and low voltage connections 78. Body 72 serves as an end cover for the end of cell assembly 20 opposite end cover 34 and houses all internal components of battery management system 70 (e.g., circuitry, memory, etc.). Various exemplary embodiments of battery management system bodies are shown in FIGS. 9 and 10A-10D.

Shunt terminal 74 provides a connection point for current shunts for cell assembly 20. According to an exemplary embodiment, shunt terminals 74 are located on the end of body 72 in line with connectors 64. Shunt connectors 75 couple shunt terminals 74 to terminals 24, 25 and serve to transfer electrical current from terminals 24, 25 to the shunt. According to another exemplary embodiment, shunt terminals 74 could be located on the end of body 72 opposite cell assembly 20. Cable connectors 83, are configured to provide terminals for output cables (e.g., ring terminals, quick connect with protective shroud, etc.). High voltage connections 76 receive high voltage sense leads, which are conductive members (e.g., lines, wires, strips, conduits, etc.) that facilitate collecting voltage measurements and other electrical measurements for individual cells. Low voltage connections 78 receive low voltage leads.

Referring generally to the FIGURES, according to an exemplary embodiment, battery management system 70 is configured to cooperate with outside beams 40, top cover 32, and center beam 36 so that battery management system 70 can be bolted to outside beams 40, top cover 32, and center beam 36 and in a manner that defines one or more spaces 35 above and/or below cells 22 to facilitate airflow over cells 22. According to other exemplary embodiments, battery management system 70 may be coupled to outside beams 40, top cover 32, and center beam 36 by other methods (e.g., snap fit, rivets, interference fit, etc.). According to an exemplary embodiment, battery management system 70 is a dual-level system. According to other exemplary embodiments, the battery management system could be a single level system. According to still other exemplary embodiments, battery management system could have alternate locations and orientations of high voltage connections, low voltage connections, shunt connections and cable connections.

Figure 11A:
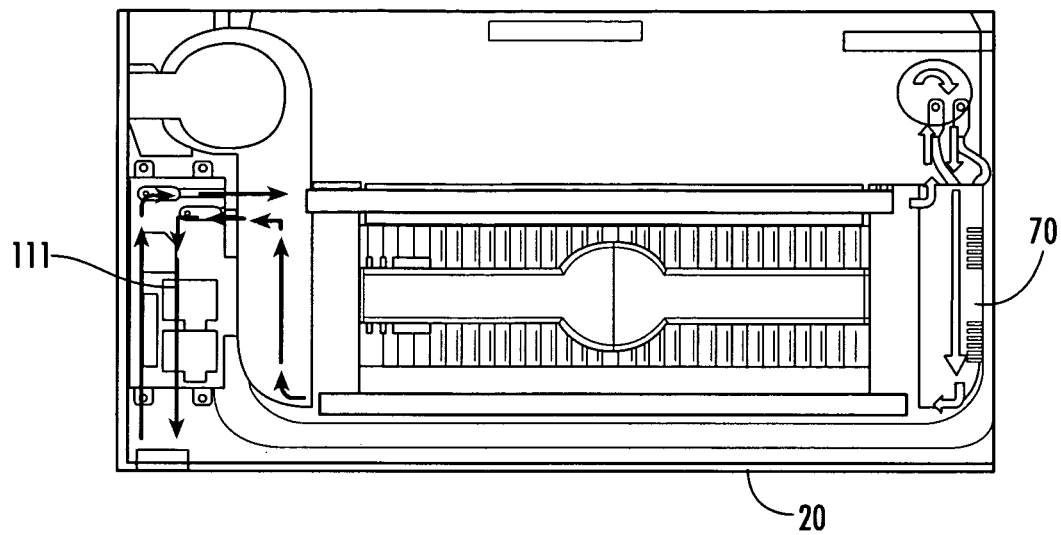
FIG. 11A is a schematic diagram of the current flow in a cell assembly.
Figure 11B:
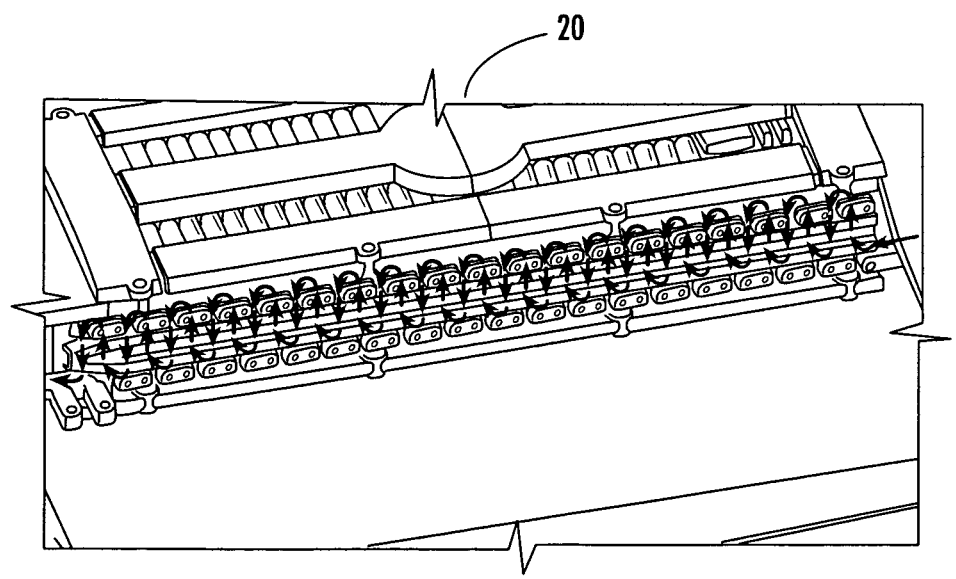
FIG. 11B is a schematic diagram of the current flow along one side of a cell assembly.

Referring to FIG. 11A, a schematic diagram of the current flow through the battery system is shown, according to an exemplary embodiment. Current may be output to and received from the rest of the vehicle via a vehicle power system interface 111. Current may flow through the plurality of cells packaged in the frame, and battery management system 70. Referring to FIG. 11B, a schematic diagram of the current flow along one side of a cell assembly is shown, according to an exemplary embodiment. If the cells are oriented such as the cells shown in FIG. 6B, where terminals 25 and 24 are oppositely oriented in adjacent cells, the current will flow through adjacent cells, from positive terminal to negative terminal, and so on. According to various exemplary embodiments, the cell orientation and the current flow through the cells may be different than that shown in FIGS. 11A and 11B.

Referring now to FIGS. 12A, 12B and 12C, a schematic representation of the flow of a gas such as air through cell assembly 20 is shown. According to an exemplary embodiment, air is provided to cell assembly 20 by a source (shown as a fan of forced air system 31). According to an exemplary embodiment, air is forced into spaces 35 above cells 22 and downward between cells 22 through channels defined by ribs 62 of spacers 60. According to other exemplary embodiments, air could be forced into spaces 35 below cells 22 and upward in-between cells 22 through channels defined by ribs 62 of spacers 60. While forced air system 31 is shown as a forced air system having a fan, forced air system may be of any type or design of the past, present or future capable of providing cooling gas to cell assembly 20. FIG. 12A illustrates forced air being provided across the two rows of cells 22 down the longitudinal axis of the frame and beams, using spaces created above or below cells 22 by the structures of the frame. FIG. 12B illustrates air being forced into a space created above cells 22 by the coupling of the top cover to the outside beams. Air initially flowing above cells 22 (e.g., as shown in FIG. 12B, etc.), may further flow down between cells 22 and below cells 22 by the spaces created between and below cells 22 by the frame. FIG. 12B also illustrates a bottom cover 33 that may couple or attach to the outside beams similarly to the top cover 32. FIG. 12C illustrates that air flowing above or below cells 22 may flow into each space created between cells 22 by the structures of the battery system (e.g., fins 39, fins 46, guides 48, holes 50, spacer 60, etc.).

Referring now to FIGS. 13-16 and according to another exemplary embodiment, beam 80 is shown. Beam 80 is a generally elongated member that provides rigidity to frame 30 and locates and spaces cells 22. Beam 80 also provides conductive paths with integrally formed connectors 87. According to one exemplary embodiment, beam 80 comprises a web portion 82, flanges 84, fins 85, vent holes 86, connectors 87, leads 88 and lead holes 89.

Beam 80 may be formed or constructed by an injection molding process. A possible mold for this process is partially shown in FIGS. 13-15, according to an exemplary embodiment. FIG. 13A shows perspective view of a possible mold for the front side of an outer beam (e.g., the side opposite the cells, etc.). FIG. 13A shows how conductive paths, integrally formed connectors 87, and leads 88 may be embedded or integrally formed into a beam using an injection mold. FIG. 13B shows a close-up perspective view of leads 88 over a mold space that will eventually form a lead hole within beam 80. FIGS. 14A and 14B show a perspective view and a close-up perspective view of leads 88 bent or installed into a mold space that will eventually form a lead hold within beam 80.

FIG. 15A shows the rear side of molded beam 80 seated within the injection mold shown in FIGS. 13-14, according to an exemplary embodiment. Flanges 84 are provided along the top and bottom longitudinal edges of beam 80 and generally add rigidity to beam 80 by increasing bending strength. Fins 85 are protrusions (e.g., projections, spines, protuberances, partitions, etc.) spaced at regular intervals along the longitudinal axis of beam 80 on web portion 82 and generally along the top and bottom edges of web portion 82 and serve to align and space cells 22 by guiding them to be received into the spaces between adjacent fins 85. Vent holes 86 are openings spaced at regular intervals along the longitudinal axis of beam 80 generally in line with the spaces between fins 85 that are configured to vent individual cells 22. According to an exemplary embodiment, vent holes 86 are generally round. According to other exemplary embodiments, vent holes could be oval, square, rectangular, or any other shape.

Connectors 87 are metal members or elements that are generally thin and flat and serve to connect terminals 24, 25 of adjacent cells 22 and allow electrical current to flow between adjacent cells 22. Connectors 87 have holes that serve to allow terminals 24, 25 of cells 22 to pass through connector 87. FIG. 15B shows a close-up perspective cutaway view of connectors 87 and fins 85. Connectors 87 are generally disposed between adjacent parallel fins 85. According to various other exemplary embodiments, fins 85 and connectors 87 may be oriented or spaced differently and may be of other shapes and types.

FIG. 16A shows the beam of FIG. 15A installed onto a plurality of cells 22 having alternating positive and negative terminals, according to an exemplary embodiment. The plurality of cells 22 are received by the rear side of the beam and are spaced and supported by the web portion and fins 85 shown in FIG. 15A. The terminals of the cells are shown as passed through the holes of the connectors. FIG. 16B shows a perspective close-up view of the beam of FIG. 15A, and particularly lead hole 89 and leads 88, according to an exemplary embodiment.

Leads 88 are conductive members or elements (e.g., lines, wires, strips, conduits, etc.) that facilitate collecting voltage measurements and other electrical measurements for individual cells 22. According to an exemplary embodiment, connectors 87 and leads 88 are pre-stamped and placed into an injection mold (e.g, such as the mold shown in FIGS. 13A-15B, etc.). The body (e.g., web portion, flanges, fins, etc.) of beam 80 is formed by an injection molding process and surrounds connectors 87 and leads 88. Lead holes 89 are openings that form channels and allow multiple leads 88 to be accessed at once (e.g., with a multipin connector). To facilitate the coupling of the beam to the top cover, end cover, battery management system, and vehicle, the beam may include a series of spaced apertures configured to receive bolts extending from or through the top cover, end cover, battery management system, and vehicle. According to other embodiments, the beam could be coupled to other components by other suitable means (e.g., snap fit, rivets, interference fit).

According to another exemplary embodiment, connectors 87 and leads 88 may not be pre-stamped pieces. Connectors 87 could be formed from a strip of metal that is formed (e.g., separated into multiple connectors, punched with terminal holes, etc.) in the injection mold tool. According to this embodiment, leads 88 would not be integrally formed with connectors 87.

Referring now to FIGS. 17A and 17B, the installation of cell assembly and other components into housing 10 is shown according to an exemplary embodiment. As shown in FIG. 17A, housing 10 may include a bottom portion 171 that may serve as a bottom cover of the battery system frame and/or may otherwise attach to the bottom of the battery system frame. Housing 10 may be generally formed to fit a portion of a vehicle into which it may be installed. Referring to FIGS. 17B and 17C, cell assembly 20 is shown in housing 10 according to other exemplary embodiments. As shown in FIGS. 17B-17D, according to various exemplary embodiments, more than one side of cell assembly 20 may contain battery management system components and/or forced air components.

Figure 18:
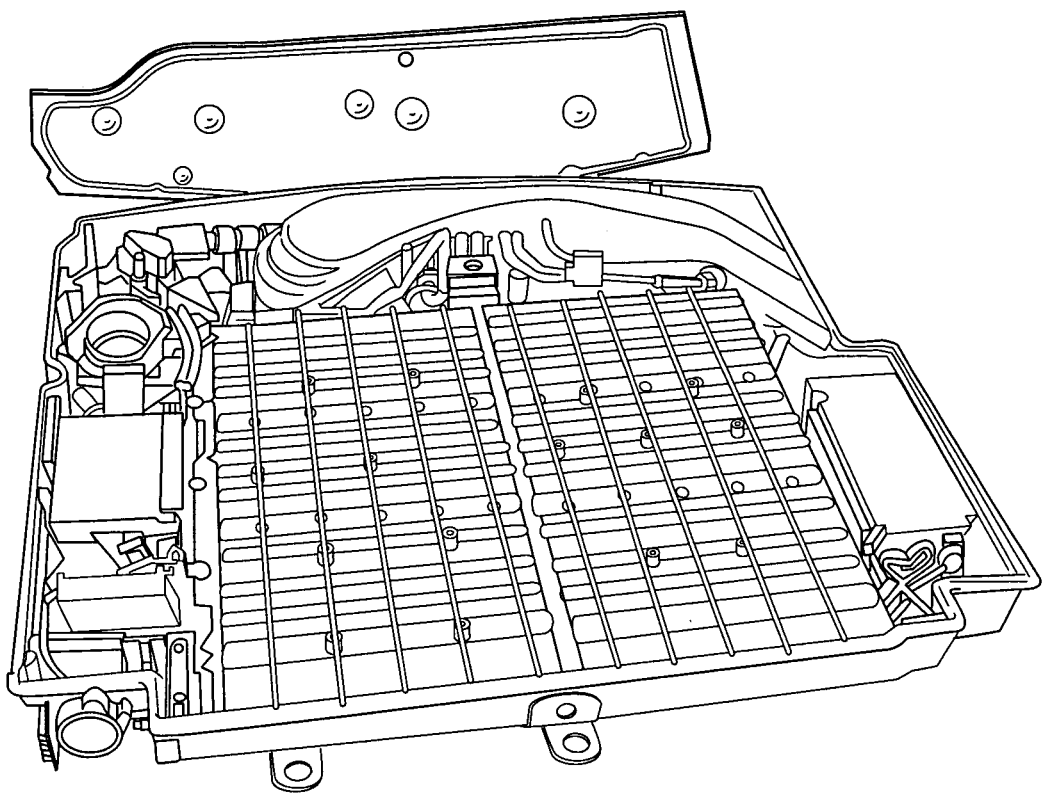
FIG. 18 is a perspective view of a NiMH cell assembly.
Figure 19:
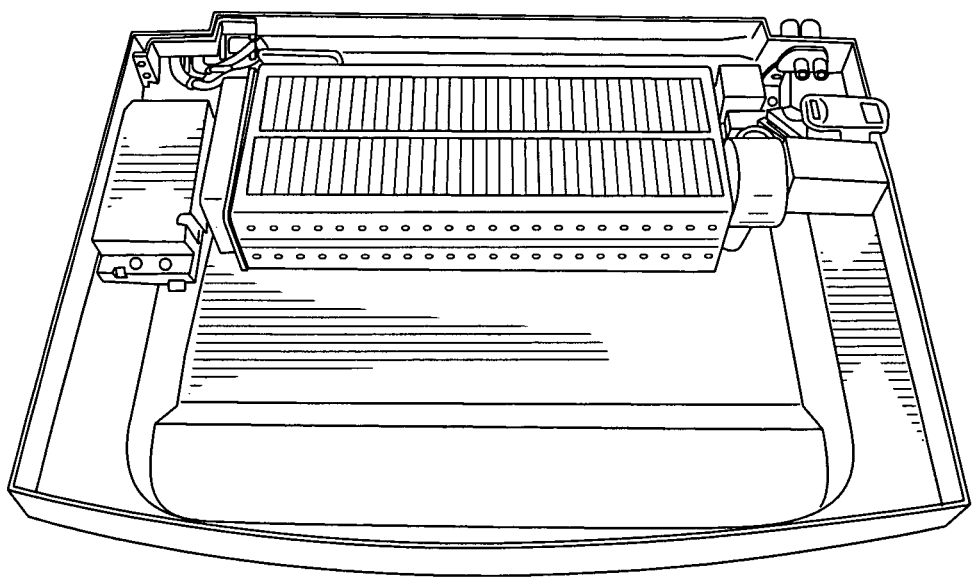
FIG. 19 is a perspective view of a cell assembly similar to that shown in FIG. 1 according to an exemplary embodiment.

Referring to FIGS. 18 and 19, exemplary embodiments of an NiMH battery system and a lithium-ion battery system are shown, respectively. The greater charge density of the lithium-ion cells compared to NiMH cells allows an assembly of lithium-ion cells to occupy less space than a comparable assembly of NiMH cells.

Those reviewing this disclosure will appreciate that various advantageous features may be obtained utilizing the exemplary embodiments shown and described herein. For example, because the battery management system is provided in close proximity (e.g., coupled to) the battery system or module, the battery system or module may be relatively simply and easily assembled and provided in a vehicle (the battery system may be preassembled by coupling the battery management system to the module prior to installation in a vehicle or after the module is installed within a vehicle), while using less material (e.g., the length of wires required to connect the battery management system to the battery module is less than if the battery management system were provided elsewhere in the vehicle).

Additionally, because the battery management system is provided adjacent or in contact with the battery system or module, the cooling gas (e.g., air) used to cool the cells of the battery system may also be used to cool the battery management system (e.g., air passing over the cells may be incident on at least a portion of the battery management system). Further, the housing of the battery management system may provide structural rigidity for the battery system by virtue of its attachment thereto.

The configuration of the battery system or module is also such that a gas such as air may pass adjacent the cells of the battery system (i.e., spacers and other structures are provided to provide spacing between adjacent cells to allow air to flow past the cells).

According to any exemplary embodiment, a battery system or module includes a plurality of cells that are arranged in two rows arranged back-to-back (e.g., with terminals facing outward). The cells are coupled to a frame and the frame forms air spaces above and below each row of cells. A gap is maintained between adjacent cells with spacing elements. Air is forced through air gaps and spaces above, below, and between cells, removing excess heat. Other exemplary embodiments could include more or fewer rows of cells.

According to any exemplary embodiment, the battery management system is configured in a way that allows it to be used as a cover for one end of the battery or frame, simplifying the assembly, reducing the length of the wires needed to connect the battery management system to the battery, and allowing the battery management system to receiving a portion of the cooling gas flow.

While the exemplary embodiments illustrated in the figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any process or method steps may be varied or re-sequenced according to alternative embodiments.

It should be noted that references to "front," "back," "upper," and "lower" in this description are merely used to identify various elements as are oriented in the FIGURES, with "front" and "back" being relative the vehicle in which the battery assembly is placed.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the battery system and/or cell assembly as shown in the various exemplary embodiments is illustrative only. For example, a single piece could replace two, more, or all of the frame components, and may further simplifying assembly by reducing both labor and parts. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements (e.g., battery management system, connectors, beams, etc.), the position of elements may be reversed or otherwise varied (e.g., orientation of cells), and the nature or number of discrete elements or positions may be altered or varied (e.g., more or fewer cells could be used, depending on the needs and/or space constraints of different vehicles). Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions as expressed in the appended claims.

What is claimed is:
1. A battery system comprising:
a plurality of electrochemical cells, each cell having at least one terminal;

a frame configured to secure the electrochemical cells in place, wherein the frame comprises:
an inner member disposed on a first side of the plurality of electrochemical cells, wherein the inner member comprises spacers configured to space each cell of the plurality of cells a distance from each other to facilitate a flow of a fluid between each cell of the plurality of cells; and
at least one outer member disposed on a second side of the plurality of electrochemical cells opposite the first side such that the plurality of electrochemical cells is retained only on the first and second sides, wherein the at least one outer member comprises openings configured to receive the terminals of the plurality of electrochemical cells, and the at least one outer member also comprises spacers configured to space each cell of the plurality of cells a distance from each other to facilitate a flow of a fluid between each cell of the plurality of cells;
a battery management system provided at a first end of the frame; and
a device provided at a second end of the frame configured to provide the fluid to the cells and to the battery management system.

2. The battery system of claim 1 further comprising a plurality of connectors, each of the connectors comprising a conductive element configured to couple to terminals of adjacent electrochemical cells to facilitate electrical current flow between the terminals of the adjacent electrochemical cells.

3. The battery system of claim 1 further comprising a plurality of insulating members, wherein each of the insulating members at least partially covers a conductive element.

4. The battery system of claim 1 wherein the second end of the frame is provided opposite the first end of the frame.

5. The battery system of claim 1 wherein the spacers comprise guiding surfaces configured to guide each cell of the plurality of electrochemical cells into a socket.

6. The battery system of claim 1 wherein the electrochemical cells comprise prismatic cells.

7. The battery system of claim 1 wherein the spacers comprise a web portion and a plurality of ribs configured to allow the fluid to flow between adjacent electrochemical cells.

8. The battery system of claim 1 wherein the battery management system comprises a housing and serves as an end cover for the frame.

9. The battery system of claim 1 wherein the inner member comprises a first side and a second side facing opposite the first side, wherein the spacers of the inner member are disposed on the first side and the second side of the inner member, wherein the plurality of electrochemical cells is provided in a first row on the first side of the inner member and a second row on the second side of the inner member with the terminals of the plurality of electrochemical cells facing away from the inner member, and wherein the frame comprises a first outer member comprising openings configured to receive the terminals of the plurality of electrochemical cells and a second outer member comprising openings configured to receive the terminals of the plurality of electrochemical cells.

10. The battery system of claim 1 further comprising at least one cover coupled to the frame that is configured to define a space for the fluid to flow.

11. The battery system of claim 1 wherein a fan provides the fluid, and the fluid is a cooling gas.

12. The battery system of claim 1 wherein the electrochemical cells are lithium-ion cells.

13. A battery system comprising:
a plurality of electrochemical cells, each cell having at least one terminal;
a frame for securing the electrochemical cells in place, wherein the frame comprises:
an inner member disposed on a first side of the plurality of electrochemical cells, wherein the inner member comprises spacers configured to space each cell of the plurality of cells a distance from each other to facilitate the flow of a cooling gas between each cell of the plurality of cells; and
at least one outer member disposed on a second side of the plurality of electrochemical cells opposite the first side such that the plurality of electrochemical cells is retained only on the first and second sides, wherein the at least one outer member comprises openings configured to receive the terminals of the plurality of electrochemical cells, and the at least one outer member also comprises spacers configured to space each cell of the plurality of cells a distance from each other to facilitate the flow of a cooling gas between each cell of the plurality of cells;
a plurality of connectors, each of the connectors comprising a conductive element configured to couple to terminals of adjacent electrochemical cells to facilitate electrical current flow between the terminals of the adjacent electrochemical cells; and
an insulating body at least partially surrounding each of the conductive elements.

14. The battery system of claim 13 comprising a battery management system coupled to a first end of the frame and a device coupled to a second end of the frame, wherein the device is configured to provide the cooling gas to the electrochemical cells and to the battery management system.

15. The battery system of claim 14 wherein the battery management system comprises a housing and serves as an end cover for the frame.

16. The battery system of claim 14 wherein the device is configured to pass the cooling gas over the cells and toward the battery management system such that the cooling gas is incident on at least a portion of the battery management system.

17. The battery system of claim 13 wherein the connectors are configured to couple to the cell terminals.

18. The battery system of claim 13 wherein the connectors are integrally formed within the outer member having openings configured to receive the cell terminals.

19. The battery system of claim 13 wherein the connectors are coupled to leads at least partially integral with the outer member.

20. The battery system of claim 19 wherein the leads are voltage sense lines.

21. A battery system comprising:
a plurality of electrochemical cells, each cell having at least one terminal;
a frame configured to secure the plurality of electrochemical cells in place, wherein the frame comprises a first outer member, a second outer member, and at least one inner member;
a plurality of connectors, each of the connectors comprising an electrically conductive element configured to couple to terminals of adjacent electrochemical cells to facilitate electrical current flow between the terminals of the adjacent electrochemical cells;
an insulating body at least partially surrounding each of the conductive elements; and a device coupled to the frame, wherein the device is configured to provide a cooling gas to the cells;

wherein the plurality of electrochemical cells is provided in a first row of electrochemical cells and a second row of electrochemical cells with the terminals of the plurality of electrochemical cells facing outward, the first row being partially received by the first outer member of the frame, the second row being partially received by the second outer member of the frame, and the first and second rows being partially received by the at least one inner member disposed between the first and second rows such that the first and second rows of electrochemical cells are retained only by the at least one inner member and the first and second outer members, respectively, wherein the first outer member and the second outer member each comprise terminal holes and spacers configured to hold each cell of the corresponding row of electrochemical cells in a spaced apart relation relative to each other to facilitate the flow of the cooling gas between the cells.

22. The battery system of claim 21 further comprising a battery management system coupled to the frame opposite the device providing the cooling gas, wherein the cooling gas is provided to the electrochemical cells and to the battery management system simultaneously.

23. The battery system of claim 22 wherein the spacers are provided between each adjacent cell of the plurality of cells to provide space for the cooling gas to travel between the adjacent cells.

24. The battery system of claim 23 wherein the spacers comprise a web portion and a plurality of ribs configured to allow the cooling gas to flow between the adjacent cells.

25. The battery system of claim 24 further comprising a cover that defines an air space between the cover and the plurality of cells, wherein the cooling gas flows into the space between the cover and the plurality of the cells and then through the plurality of cells through channels defined by the ribs of the spacers.

26. The battery system of claim 13 wherein the electrochemical cells comprise prismatic cells.

27. The battery system of claim 21 wherein the electrochemical cells comprise prismatic cells.

28. The battery system of claim 13, comprising a device configured to actively provide the flow of the cooling gas.

* * * * *